(12) United States Patent
Boel et al.

(10) Patent No.: US 11,890,570 B2
(45) Date of Patent: Feb. 6, 2024

(54) FILTER DEVICE AND METHOD FOR SWITCHING ON AND/OR SWITCHING OFF SUCH FILTER DEVICE

(71) Applicant: ATLAS COPCO AIRPOWER, N.V., Wilrijk (BE)

(72) Inventors: Stefaan Boel, Wilrijk (BE); Marc Steijnen, Wilrijk (BE); Sylwester Manski, Wilrijk (BE); Peter Waeterschoot, Kruibeke (BE)

(73) Assignee: ATLAS COPCO AIRPOWER N.V., Wilrijk (BE)

( * ) Notice: Subject to any disclaimer, the term of this patent is extended or adjusted under 35 U.S.C. 154(b) by 573 days.

(21) Appl. No.: 15/733,957

(22) PCT Filed: Jun. 19, 2019

(86) PCT No.: PCT/IB2019/055136
§ 371 (c)(1),
(2) Date: Dec. 1, 2020

(87) PCT Pub. No.: WO2020/003057
PCT Pub. Date: Jan. 2, 2020

(65) Prior Publication Data
US 2021/0229019 A1 Jul. 29, 2021

(30) Foreign Application Priority Data
Jun. 26, 2018 (BE) .................... 2018/5446

(51) Int. Cl.
B01D 46/42 (2006.01)
B01D 46/00 (2022.01)
B01D 46/24 (2006.01)

(52) U.S. Cl.
CPC ..... *B01D 46/4272* (2013.01); *B01D 46/0004* (2013.01); *B01D 46/0043* (2013.01);
(Continued)

(58) Field of Classification Search
None
See application file for complete search history.

(56) References Cited

U.S. PATENT DOCUMENTS 4,271,020 A 6/1981 Van Meter
4,731,183 A 3/1988 Schumacher, II
(Continued)

FOREIGN PATENT DOCUMENTS

CA 2 547 727 A1 11/2006
CN 104096408 A 10/2014
(Continued)

OTHER PUBLICATIONS

Written Opinion for PCT/IB2019/055136, dated Aug. 21, 2019.
International Search Report for PCT/IB2019/055136, dated Aug. 21, 2019.

*Primary Examiner* — Brit E. Anbacht
(74) *Attorney, Agent, or Firm* — Sughrue Mion, PLLC

(57) ABSTRACT

A filter device separating impurities from a gas, including a filter housing having a lid and a pot; the lid having an inlet and an outlet; a filter element in the pot with a top cap and a bottom cap with a filter cartridge therebetween; the top cap has an inlet duct connected to the lid inlet so that the gas to be purified is passed through the inlet duct to the filter cartridge; a space is between the lid and the top cap which is connected to the outlet of the lid; a switching element to be installed rotatably in the lid and rotatable between an off-position in which the inlet port or the outlet port connects to respectively the inlet or outlet of the lid, and a twisted position, in which the entrance of the inlet duct of the top cap can connect to the lid inlet.

19 Claims, 3 Drawing Sheets

(52) U.S. Cl.
 CPC ..... *B01D 46/0087* (2013.01); *B01D 46/2414* (2013.01); *B01D 2271/02* (2013.01)

(56) References Cited

U.S. PATENT DOCUMENTS

| | | | |
|---|---|---|---|
| 6,592,769 B1 * | 7/2003 | Erickson | B01D 21/0093 |
| | | | 210/801 |
| 6,626,884 B1 * | 9/2003 | Dillon | A61B 5/150366 |
| | | | 604/323 |
| 10,232,096 B2 * | 3/2019 | Kana | A61M 1/79 |
| 2004/0065602 A1 | 4/2004 | Moscaritolo et al. | |
| 2012/0186208 A1 | 7/2012 | Jen et al. | |
| 2017/0348468 A1 * | 12/2017 | Kana | A61M 1/79 |
| 2018/0021538 A1 * | 1/2018 | Shirley | A61M 16/0816 |
| | | | 128/201.13 |
| 2023/0116637 A1 * | 4/2023 | Fenske | F01M 13/0011 |
| | | | 55/309 |

FOREIGN PATENT DOCUMENTS

| | | |
|---|---|---|
| CN | 204 900 932 U | 12/2015 |
| CN | 107 648 940 A | 2/2018 |
| WO | 99/30803 A1 | 6/1999 |
| WO | 00/72939 A1 | 12/2000 |
| WO | 2006/050114 A1 | 5/2006 |
| WO | 2006/125311 A1 | 11/2006 |
| WO | 2008/115985 A2 | 9/2008 |

\* cited by examiner

FILTER DEVICE AND METHOD FOR SWITCHING ON AND/OR SWITCHING OFF SUCH FILTER DEVICE

CROSS REFERENCE TO RELATED APPLICATIONS

This application is a National Stage of International Application No. PCT/IB2019/055136 filed Jun. 19, 2019, claiming priority based on Belgian Patent Application No. 2018/5446 filed Jun. 26, 2018.

BACKGROUND OF THE INVENTION

Field of the Invention

The current invention relates to a filter device and method for switching on and/or switching off such filter device.

More specifically, the filter device is intended to filter out impurities such as oil and dust from a gas such as compressed air.

Background

There are already such filter devices known, which consist of a filter housing in which a filter element can be placed. The filter housing consists of a lid and a pot containing the filter element, whereby the lid is typically screwed onto the pot or connected to the pot via a bayonet fitting.

The lid is provided with an inlet for gas to be purified and an outlet for purified gas.

The filter element itself consists of a top cap and a bottom cap with a filter cartridge consisting of filter material in between.

The top cap is provided with an inlet duct that can lead gas to be purified to the inside of the filter cartridge. The filter element can be mounted in such a way that the entrance of the inlet duct is connected to the inlet of the lid, so that gas to be purified that flows through the inlet of the lid into the filter device is directed to the filter cartridge.

There will then be a space between the lid and the top cap which is connected to the outlet of the lid, whereby the gas which has passed through the filter cartridge can leave the filter device via the aforementioned space and the outlet.

It is known that the design of the inlet duct in the top cap will play an important role in the pressure drop in the filter device.

It is known that the filter cartridge is saturated over time and needs to be replaced.

For this purpose, a machine in which the filter device has been used, shall be shut down. Next, the pot can be detached from the lid and the filter element can be taken out of the pot. A new filter element is then placed in the pot and the pot is attached to the lid again.

This has the disadvantage that the machine must be stopped and then restarted. For example, if the machine is a compressor, the supply of compressed gas is stopped, which is undesirable for consumer applications that continuously require compressed gas.

Moreover, for most machines, the number of restarts should be limited as much as possible, as this can cause wear and tear to the machine.

In order to limit the number of restarts and interruptions in the supply of compressed gas, solutions are already in place in which a bypass line is provided parallel and externally to the filter device with the necessary additional pipes and shut-off valves that allow bypassing the filter device, so that the filter device can be taken out of operation without interruption of the machine to replace the filter element.

Sometimes an additional filter is provided in the bypass line to ensure that the gas that passes through the bypass line during the replacement of the filter element is still more or less purified of contaminants.

However, the additional pipes and shut-off valves cause an additional pressure drop and pose an additional risk of gas leaks, which have an impact on the energy efficiency of the machine.

Furthermore, the additional pipes and shut-off valves provide an additional complexity of the filter installation, which implies a higher installation cost, a larger size of the filter installation and a longer filter installation time compared to a filter installation without these additional pipes and shut-off valves.

The present invention aims to offer a solution to at least one of the aforementioned and/or other disadvantages by providing a filter device that can realize a switch-off and/or switch-on of the filter element without the need for additional valves and possibly pipes.

SUMMARY OF THE INVENTION

The current invention has a filter device to separate impurities from a gas to be purified as subject,
  whereby the filter device includes a filter housing consisting of a lid and a pot;
  whereby the lid is provided with an inlet for gas to be purified and an outlet for purified gas;
  whereby a filter element is installed in the pot, which filter element consists of a top cap and a bottom cap with a filter cartridge in between;
  whereby the top cap is provided with an inlet duct with an entrance, which entrance can connect to the inlet of the lid in such a way that the gas to be purified is passed through the inlet duct to the filter cartridge; and
  whereby there is a space between the lid and the top cap which may be connected to the outlet of the lid,
with the characteristic that the filter device is further provided with a switching element with an inlet port and an outlet port, whereby the switching element is configured in such a way that
  it can be rotatably installed in the lid; and
  it can be rotated between on the one hand an off-position, in which the inlet port or outlet port connects to the inlet or outlet of the lid respectively, and on the other hand a twisted position, in which this is not the case and in which the entrance to the inlet duct of the top cap can connect to the inlet of the lid.

An advantage is that by integrating a switching element in the lid of the filter device, the filter device can be deactivated without additional shut-off valves by rotating the switching element in the off-position, after which the pot can be detached to replace the filter element without the release of unpurified gas to the environment.

In a preferred embodiment of the invention, the switching element is a bypass element, whereby the inlet port and outlet port are in fluid connection with each other through a bypass channel, so that the gas to be purified can flow from the inlet to the outlet of the lid when the switching element is rotated in the off-position.

The advantage of this embodiment is that the filter element can be replaced without having to shut down the machine, as the gas to be purified will flow via the bypass element through the lid.

In addition, there are no additional pipes and shut-off valves, so that the associated disadvantages are avoided.

A filter material is preferably applied in the bypass duct, in such a way that the gas to be purified is still more or less purified of contaminants, even if the filter device is bypassed when the bypass element is rotated in the off-position.

In an alternative design, the inlet port and outlet port of the switching device are not in fluid connection with each other, so that the gas to be purified cannot flow from the inlet to the outlet of the lid when the switching device is rotated in the off-position. Hereby, the filter element can still be replaced in a correct and safe way when the switching element is rotated in the off-position.

Preferably, blocking means are provided to block the top cap relative to the switching element, in such a way that the top cap rotates along with the switching element.

This will cause both the top cap and the switching element to rotate, so that either the top cap will connect to the inlet of the lid, or the switching element, depending on the position of the switching element.

The advantage of this is that both the top cap and the switching element are in the correct position through one single action, so that the filter device can easily be switched on or off in a correct and safe manner.

Alternatively, it may also be possible, for example, to rotate the top cap first and then the switching element. This of course requires two actions and can also lead to errors.

In a practical version of the invention, the inlet port and outlet port of the switching element are provided with a non-removable seal.

This has the advantage that the seal between the inlet port, respectively the outlet port, and the inlet, respectively the outlet, of the lid will be very good, so that no leaks can occur.

The mechanical or chemical connection between the seal and the switching element is very important to ensure that the seal is not damaged or loosened during the rotation of the switching element.

For this reason, it is preferable to use a non-removable seal and not, for example, a removable O-ring that is placed in a groove provided for this purpose, as this O-ring can easily come loose during the rotation.

The current invention also has a method for switching off and/or switching on a filter device to separate impurities from a gas to be purified,
- whereby the filter device includes a filter housing consisting of a lid and a pot;
- whereby the lid is provided with an inlet for gas to be purified and an outlet for purified gas;
- whereby a filter element is installed in the pot, which filter element consists of a top cap and a bottom cap with a filter cartridge in between;
- whereby the top cap has an inlet duct with an entrance, which can connect to the inlet of the lid in such a way that the gas to be purified is passed through the inlet duct to the filter cartridge; and
- whereby there is a space between the lid and the top cap which may be connected to the outlet of the lid, with the characteristic that the filter device is further provided with a switching element with an inlet port and an outlet port, whereby the switching element is rotated in the lid between on the one hand an off-position, in which the inlet port or outlet port connects to the inlet or outlet of the lid respectively, and on the other hand a twisted position, in which this is not the case and in which the entrance of the inlet duct of the top cap can be connected to the inlet of the lid.

BRIEF DESCRIPTION OF THE DRAWINGS

With the insight to better demonstrate the characteristics of the invention, the following describes, as an example without any restrictive character, some preferred embodiments of a filter device according to the invention, with reference to the accompanying drawings, in which.

Figure 2:
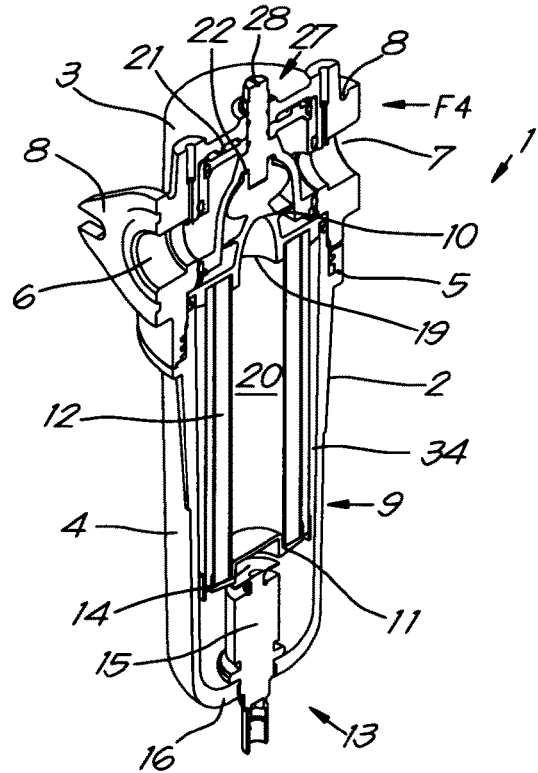
FIG. 2 schematically and in perspective represents a cross-section according to line II-II in FIG. 1.
Figure 4:
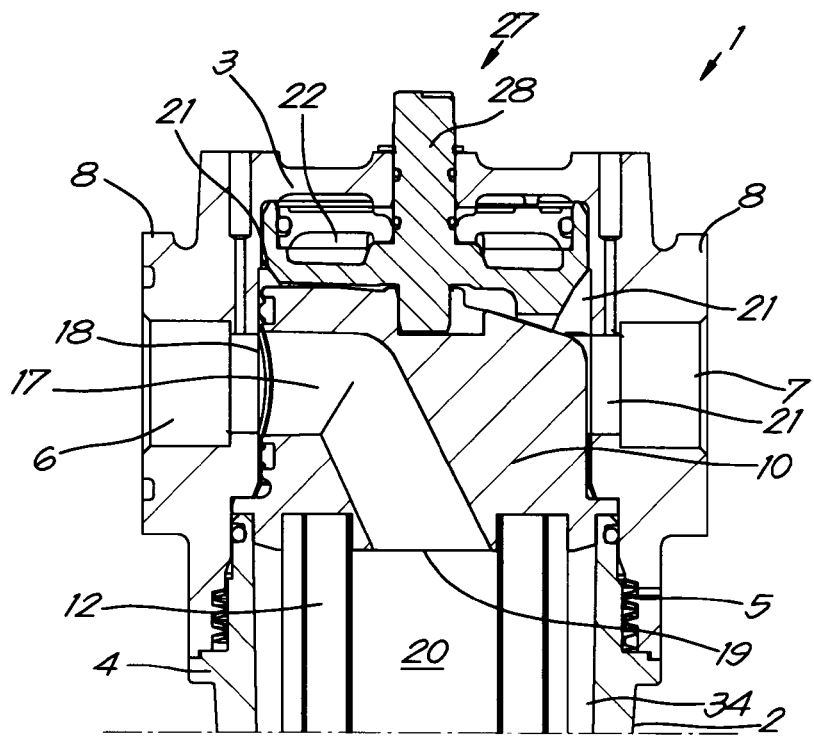
Figure 5:
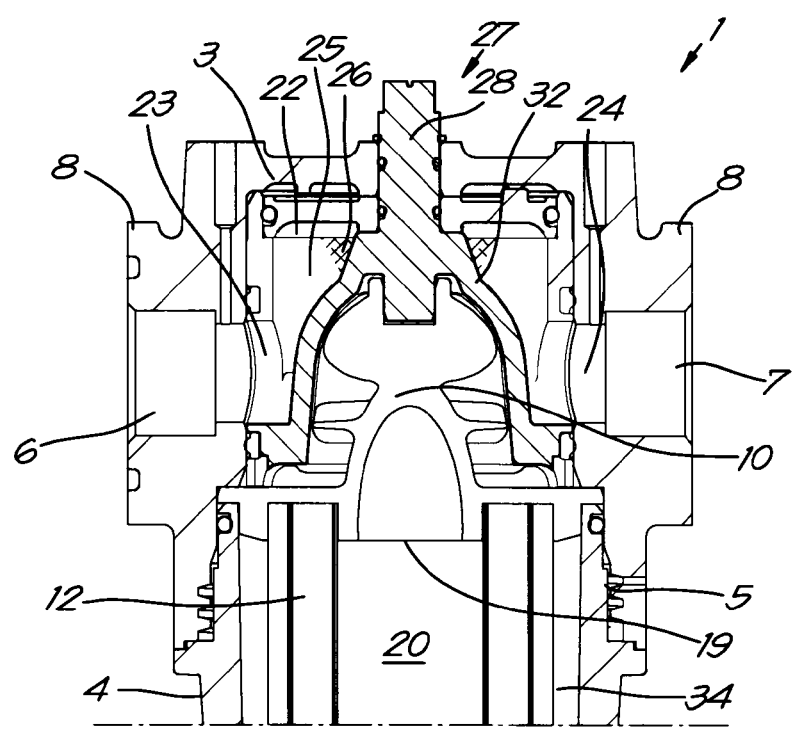

The part indicated by F4 in FIG. 2 is shown on a larger scale and in two different positions in FIGS. 4 and 5.

DETAILED DESCRIPTION OF THE INVENTION

Figure 1:
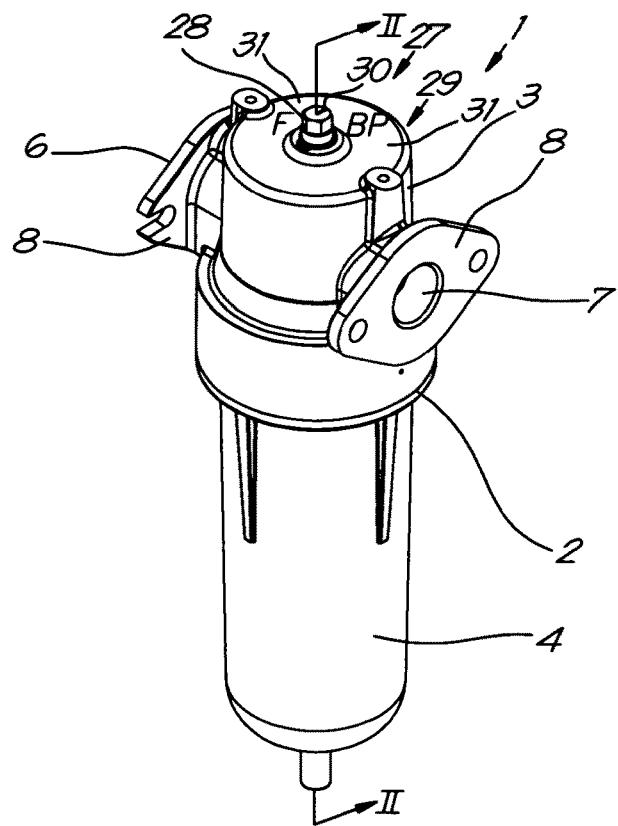
FIG. 1 schematically and in perspective shows a filter design according to the invention.

FIG. 1 shows a filter device 1 according to the invention to separate impurities from a gas.

This gas may be compressed air, for example, but the invention is not limited thereto.

The above-mentioned impurities can be oil, water and/or dust.

The filter device 1 contains a filter housing 2, which consists of a lid 3 and a pot 4, which can be mounted on top of each other to form the filter housing 2.

In the example shown, the pot 4 is screwed into the lid 3, whereby both the lid 3 and the pot 4 are provided with a cooperating screw thread 5.

It is not excluded that the pot 4 is fixed in the lid 3 by means of a bayonet fitting or some other way.

The lid 3 is provided with an inlet 6 for gas to be purified and an outlet 7 for purified gas. Typically, the filter device 1 with its lid 3 is mounted in a pipe of a machine, such as a compressor installation. For this purpose, the lid 3 at the inlet 6 and the outlet 7 are provided with flanges 8 suitable thereto.

In the filter housing 2, more specifically in the pot 4, a filter element 9 is installed. This is shown in FIG. 2, which shows a cross-section.

The filter element 9 consists of a top cap 10 and a bottom cap 11 with a filter cartridge 12 between them, which is made of filter material.

The bottom cap 11 is optionally provided with means 13 to translationally position and/or fix the filter element 9 in the pot 4 in each direction after mounting of the pot 4 in the lid 3.

These means 13 are implemented as a cavity 14 or recess that can work together with a thereto provided rod 15 in the bottom 16 of the pot 4.

In addition, these means 13 are designed in such a way that the filter element 9 can be rotated in the pot 4. This means that it is possible that the filter element 9 rotates around its axis in the pot 4.

The detailed FIGS. 4 and 5 clearly show how the top cap 10 is made.

The top cap 10 is provided with an inlet duct 17 that can lead gas to be purified to the filter cartridge 12, when the top cap 10 is rotated to the corresponding position in the lid 3. This position will from now on be called the 'twisted position'.

The inlet duct 17 has an inlet 18 which, when the pot 4 is mounted in the lid 3, can connect to the aforementioned inlet 6 of the lid 3, when the top cap 10 is in the twisted position.

The inlet duct 17 also has an outlet 19 that connects to the interior 20 of the filter cartridge 12.

In the aforementioned 'twisted position', gas entering the filter device 1 through the inlet 6 must pass through the filter cartridge 12 before it can leave the filter device 1 through the outlet 7.

As one can clearly see in FIG. 4, there is a space 21 between the lid 3 and the top cap 10 that is connected to the outlet 7 of the lid 3.

Figure 3:
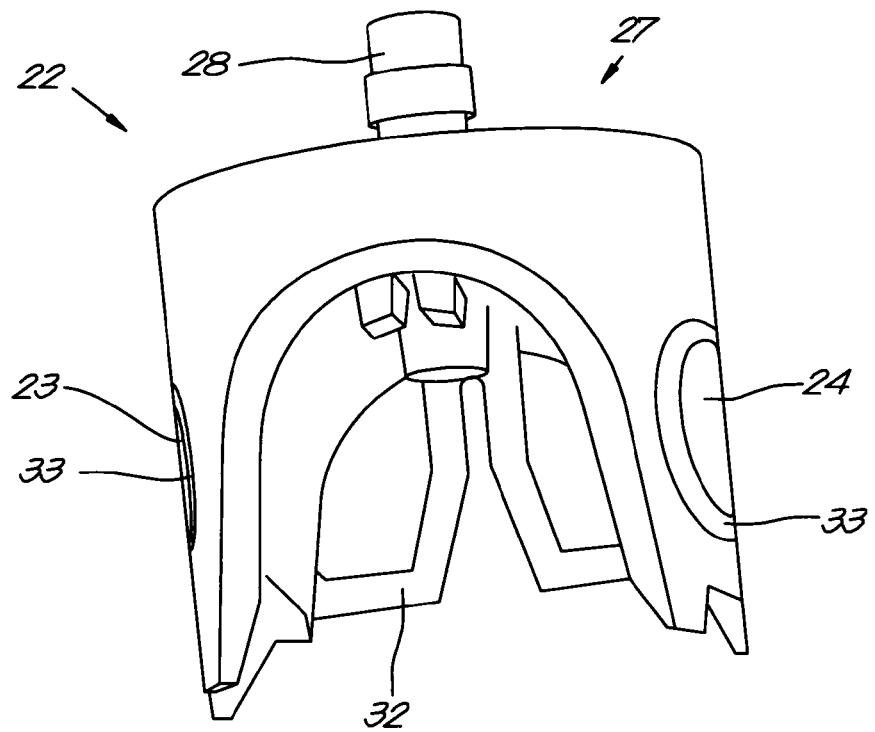
FIG. 3 schematically and in perspective represents the switching element in FIG. 2.

This space also contains a switching element 22, in this case a bypass element, which is shown in detail in FIG. 3.

The bypass element as switching element 22 is provided with an inlet port 23 and an outlet port 24 which are connected to each other via a bypass duct 25, i.e. the inlet port 23 and the outlet port 24 are mutually connected via the bypass duct 25.

The switching element 22 is rotatably installed in the lid 3 so that it can be rotated between an off-position in which the inlet port 23 connects to the inlet 6 and the outlet port 24 connects to the outlet 7 of the lid 3 and a twisted position in which this is not the case.

In the off-position, gas entering the filter device 1 through the inlet 6 will be able to flow directly to the outlet 7 without having to pass through the filter cartridge 12.

In the twisted position the entrance 18 of the inlet duct 17 of the top cap 10 will be connected to the inlet 6 of the lid 3.

The outlet 7 of the lid 3 will then be connected to the aforementioned space 21, as described above, and no longer to the outlet port 24.

In this case, the switching element 22 is made of a metal, but it is not excluded that it is made of plastic or ceramic material.

The switching element 22 can, for example, be manufactured via 3D printing.

A filter material 26 can be applied into the bypass duct 25.

In order to allow the rotation of the switching element 22 in the filter device 1, means 27 are provided for the rotation of the switching element 22 in lid 3, whereby these means 27 are designed in such a way that they are controllable when the pot 4 is mounted in lid 3.

This will allow the switching element 22 to be rotated when the filter device 1 is mounted in a machine.

In this case, the aforementioned means 27 include a pin 28 attached to or forming part of the switching element 22 and extending through the lid 3. By rotating the pin 28, the switching element 22 can be rotated in the lid 3 from the off-position to the twisted position.

In order to give a visual indication of the position of the switching element 22 when the filter element 1 is mounted in a machine, means 29 are provided to indicate or show whether the switching element 22 is in the off-position or in the twisted position.

FIG. 1 shows how these means 29 are made in this case, namely in the form of a notch 30 in the aforementioned pin 28 and two symbols 31 or signs on the lid 3, namely the indication 'BP' and 'F', referring respectively to 'BYPASS', corresponding to the off-position and 'FILTER' corresponding to the twisted position.

In this case, blocking means 32 are provided to block the top cap 10 in relation to the switching element 22, in such a way that the top cap 10 is rotated along with the switching element 22.

This will be in such a way that when the switching element 22 is in the off-position, this is also the case for the top cap 10. When the switching element 22 is rotated to the twisted position via the aforementioned pin 28, the top cap 10 will automatically rotate to its twisted position, whereby the inlet 18 of the inlet duct 17 of the top cap 10 connects to the inlet 6 of the lid 3.

These blocking means 32 can be executed in different ways.

For example, the top cap 10 and the switching element 22 can be provided with corresponding details, such as a groove and fin, or a click connection can be made between the two.

One requirement for the blocking means 32 is that they must be detachable or that the top cap 10 must be detachable or removable from the switching element 22.

Finally, in the off-position, a non-removable seal 33 is provided between, on the one hand, respectively the inlet port 23 or the outlet port 24 of the switching element 22 and, on the other hand, respectively the inlet 6 or the outlet 7 of the lid 3.

The seals 33 at the inlet port 23 and outlet port 24 will prevent leakage flows from occurring at the location where the inlet port 23 connects to the inlet 6 of the lid 3 and the outlet port 24 connects to the outlet 7 of the lid 3.

By providing a non-removable seal, it is possible to prevent the seal 33 from loosening or shifting during the installation of the lid 3 on the pot 4. This provides extra security against poor sealing.

The seal 33 or seals 33, which are preferably made of a thermoplastic elastomer, are preferably poured on the inlet port 23 or the outlet port 24 in a groove provided for this purpose.

In this way, the corresponding seal 33 is part of the switching element 22.

However, it is not excluded that the inlet 6 and outlet 7 of the lid 3 on a side closest to respectively the inlet port 23 and the outlet port 24 of switching element 22 in the off-position may be provided with the non-removable seal 33 instead of respectively the inlet port 23 and the outlet port 24 of switching element 22.

To protect the seal 33 from damage, the inlet 6 and/or outlet 7 of the lid 3 may be provided with a rounding or chamfer on a side closest to respectively the inlet port 23 or the outlet port 24 of the switching element 22 in the off-position. This chamfer may, for example, be made as a straight chamfer of an edge between respectively the inlet 6 and outlet 7 and a side of lid 3 closest to respectively the inlet 6 and outlet 7 in the off-position, the straight chamfer being at an angle between 5° and 45° with the side of lid 3 closest to the inlet 6 and outlet 7 respectively.

In addition, the lid 3 may have a recess on at least one of the two opposite sides of the lid which is in the twisted position closest to respectively the inlet ports 23 and 24 of the switching element 22, so that the seal 33 on the switching element 22 is not pressed when the filter device 1 is not in the off-position. This ensures that deformation of the seal 33 due to pressure loads is limited over time, which increases the service life and reliable operation of the seal 33.

The aforementioned recess is a gradual recess in a direction that coincides with a tangential direction in which the switching element 22 can rotate, so that the seal 33 is pressed in a gradual manner when rotating the filter device 1 in the off-position. This reduces the risk of damage to the seal 33 when the switching element 22 is rotated from the off-position to the twisted position and vice versa.

The operation of the filter device 1 is very simple and as follows.

During normal operation of the filter device 1, switching element 22 and top cap 10 shall be in the aforementioned twisted position.

This will allow a flow of gas to be purified that enters the filter device 1 through the inlet 6 in the lid 3, then through the inlet 18 and the inlet duct 17 from the top cap 10 to the filter cartridge 12.

The exit 19 of the inlet duct 17 connects to the interior 20 of the filter cartridge 12, so that the gas to be purified will flow through the filter cartridge 12 from the inside to the outside, thus removing impurities from the gas when passing through.

The purified gas then enters zone 34 between the filter cartridge 12 and the pot 4, from where it enters the space 21 between the top cap 10 and the lid 3.

The purified gas can then leave the filter device 1 via the outlet 7 in the lid 3.

When the filter cartridge 12 is saturated with impurities, it must be replaced.

To remove the filter device 1 in a correct and safe manner, rotate the switching element 22 to the off-position via the pin 28.

This means that the inlet 6 of the lid 3 and the outlet 7 of the lid 3 are connected to each other via the bypass duct 25 if the switching element 22 is a bypass element.

The gas to be purified will not pass through the filter element 9, but will flow through the bypass duct 25.

After releasing the pressure in the filter housing 2, it is then possible to unscrew the pot 4 from the lid 3. Hereby, the pot 4 with the filter element 9 can be removed.

To make this possible, it is necessary that the aforementioned blocking means 32 are detachable, i.e. it is necessary that the top cap 10 can be disconnected from the switching element 22.

The filter element 9 can be taken out of the pot 4 and a new filter element 9 can be placed in the pot 4.

Then the pot 4, with the new filter element 9, can be screwed back onto the lid 3.

In this case, the blocking means 32 will re-activate or interfere with each other, so that the top cap 10 cannot rotate relative to the switching element 22.

Finally, the switching element 22 is rotated to the twisted position with the help of the pin 28.

This will also cause the top cap 10 to rotate along, so that the inlet 6 of the lid 3 will reconnect to the inlet 18 of the inlet duct 17.

The normal filter operation of the filter device 1 is thus resumed.

During the replacement of the saturated filter element 9, the switching element 22 will be rotated to the off-position, and the gas to be purified will temporarily flow through the bypass duct 25 if the switching element 22 is a bypass element. If a filter material 26 is installed in the bypass duct 25 of such a bypass element, the gas to be purified will be at least partially purified of contaminants, so that the downstream systems will not be adversely affected by unpurified gas.

The present invention is by no means limited to the embodiments described as examples and shown in the figures, but a filter device according to the invention can be implemented in all shapes and sizes without going beyond the scope of the invention.

The invention claimed is:

1. A filter device for separating impurities from a gas to be purified,
   whereby the filter device (1) includes a filter housing (2) consisting of a lid (3) and a pot (4);
   whereby the lid (3) is provided with an inlet (6) for gas to be purified and an outlet (7) for purified gas;
   whereby in the pot (4) a filter element (9) is installed, which filter element (9) consists of a top cap (10) and a bottom cap (11) with a filter cartridge (12) in between;
   whereby the top cap (10) is provided with an inlet duct (17) with an entrance (18), which entrance (18) can connect to the inlet (6) of the lid (3) in such a way that the gas to be purified is passed through the inlet duct (17) to the filter cartridge (12); and
   where there is a space (21) between the lid (3) and the top cap (10) which can be connected to the outlet (7) of the lid (3),
characterized in that the filter device (1) is further provided with a switching element (22) with an inlet port (23) and an outlet port (24), the switching element (22) being configured in such a way that
   it can be installed rotatably in the lid (3); and
   it can be rotated between on the one hand an off-position, in which the inlet port (23) or the outlet port (24) connects to respectively the inlet (6) or outlet (7) of the lid (3), and on the other hand a twisted position, in which this is not the case and in which the entrance (18) of the inlet duct (17) of the top cap (10) can connect to the inlet (6) of the lid (3).

2. The filter device according to claim 1, characterized in that the switching element (22) is a bypass element, whereby the inlet port (23) and the outlet port (24) are in fluid connection with each other through a bypass duct (25), so that the gas to be purified can flow from the inlet (6) to the outlet (7) of the lid (3) when the switching element (22) is rotated in the off-position.

3. The filter device according to claim 2, characterized in that a filter material (26) is applied in the bypass duct (25).

4. The filter device according to claim 1, characterized in that the inlet port (23) and outlet port (24) of the switching element (22) are not in fluid connection with each other, so that the gas to be purified cannot flow from the inlet (6) to the outlet (7) of the lid (3) when the switching device (22) is rotated in its off-position.

5. The filter device according to claim 1, characterized in that means (27) are provided for rotation of the switching element (22) in the lid (3), the means (27) being so designed as to be controllable when the lid (3) is mounted on the pot (4).

6. The filter device according to claim 1, characterized in that the aforementioned means (27) include a pin (28) attached to or forming part of the switching element (22) and extending through the lid (3).

7. The filter device according to claim 1, characterized in that blocking means (32) are provided for blocking the top cap (10) in relation to the switching element (22), the blocking means (32) being configured in such a way that the top cap (10) is rotating along with the switching element (22).

8. The filter device according to claim 1, characterized in that the inlet port (23) and/or the outlet port (24) of the switching element (22) on a side of the inlet port (23) or the outlet port (24) closest to the inlet (6) or outlet (7) of the lid (3) respectively in the off-position, is provided with a non-removable seal (33).

9. The filter system according to claim 8, characterized in that the seal (33) on the inlet port (23) and/or the outlet port (24) is poured in a groove provided for this purpose, so that the seal (33) is part of the switching element (22).

10. The filter device according to claim 8, characterized in that the seal (33) on the inlet port (23) and/or the outlet port (24) is made of a thermoplastic elastomer.

11. The filter device according to claim 1, characterized in that the switching element (22) is made of metal.

12. The filter device according to claim 1, characterized in that means (29) are provided which are configured to indicate or show whether the switching element (22) is either in the off-position or in the twisted position.

13. The filter device according to claim 1, characterized in that the inlet (6) and/or outlet (7) of the lid (3) is provided with a rounding or chamfer on a side closest to respectively the inlet port (23) or outlet port (24) of the switching element (22) in its off-position.

14. The filter device according to claim 1, characterized in that the lid (3) is provided with a recess on at least one of the two opposite sides closest to respectively the inlet port (23) or the outlet port (24) of the switching element (22) in its twisted position.

15. The filter device according to claim 14, characterized in that the recess in a direction coinciding with a tangential direction in which the switching element can rotate, is a gradual recess.

16. A method for switching off and/or switching on a filter device (1) for separating impurities from a gas to be purified,
   whereby the filter device (1) includes a filter housing (2) consisting of a lid (3) and a pot (4);
   whereby the lid (3) is provided with an inlet (6) for gas to be purified and an outlet (7) for purified gas;
   whereby in the pot (4) a filter element (9) is installed, which filter element (9) consists of a top cap (10) and a bottom cap (11) with a filter cartridge (12) in between;
   whereby the top cap (10) is provided with an inlet duct (17) with an entrance (18), which entrance (18) can connect to the inlet (6) of the lid (3) in such a way that the gas to be purified is passed through the inlet duct (17) to the filter cartridge (12); and
   whereby there is a space (21) between the lid (3) and the top cap (10) which can be connected to the outlet (7) of the lid (3),
characterized in that the filter device (1) is further provided with a switching element (22) with an inlet port (23) and an outlet port (24), whereby the switching element (22) is rotated in the lid (3) between on the one hand an off-position, in which the inlet port (23) or outlet port (24) connects to the inlet (6) or outlet (7) of the lid (3) respectively, and on the other hand a twisted position, in which this is not the case and in which the entrance (18) of the inlet duct (17) of the top cap (10) can connect to the inlet (6) of the lid (3).

17. The method according to claim 16, characterized in that the top cap (10) is rotated along with the switching element (22) by blocking means (32) which block the top cap (10) in relation to the switching element (22).

18. The method according to claim 16, characterized in that the switching element (22) in the lid (3) is rotated by means (27), whereby these means (27) are controllable when the lid (3) is mounted on the pot (4).

19. The method according claim 16, characterized in that means (29) indicate or show whether the switching element (22) is either in the twisted position or in the off-position.

* * * * *